Figure 1:
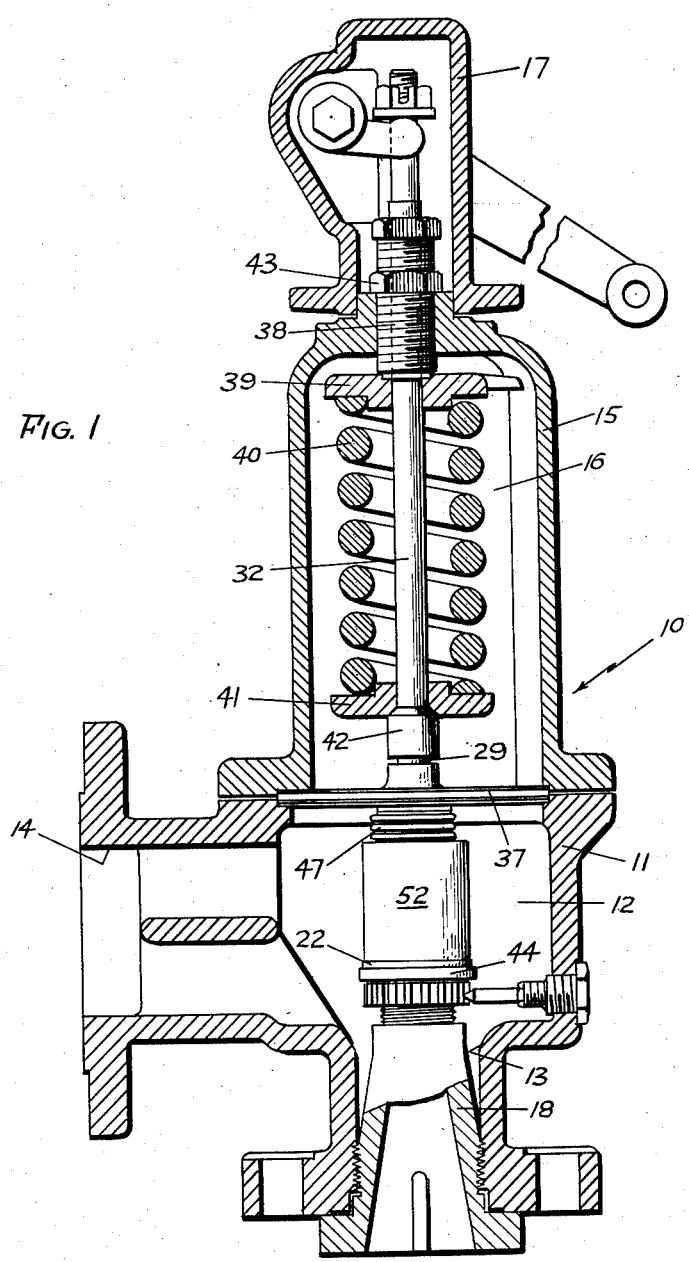

April 29, 1958 V. W. FARRIS 2,832,372
SAFETY VALVE HAVING SHIELDED SEALING MEMBER
Filed Feb. 1, 1954 2 Sheets-Sheet 1

INVENTOR
VICTOR W. FARRIS
BY
ATTORNEY

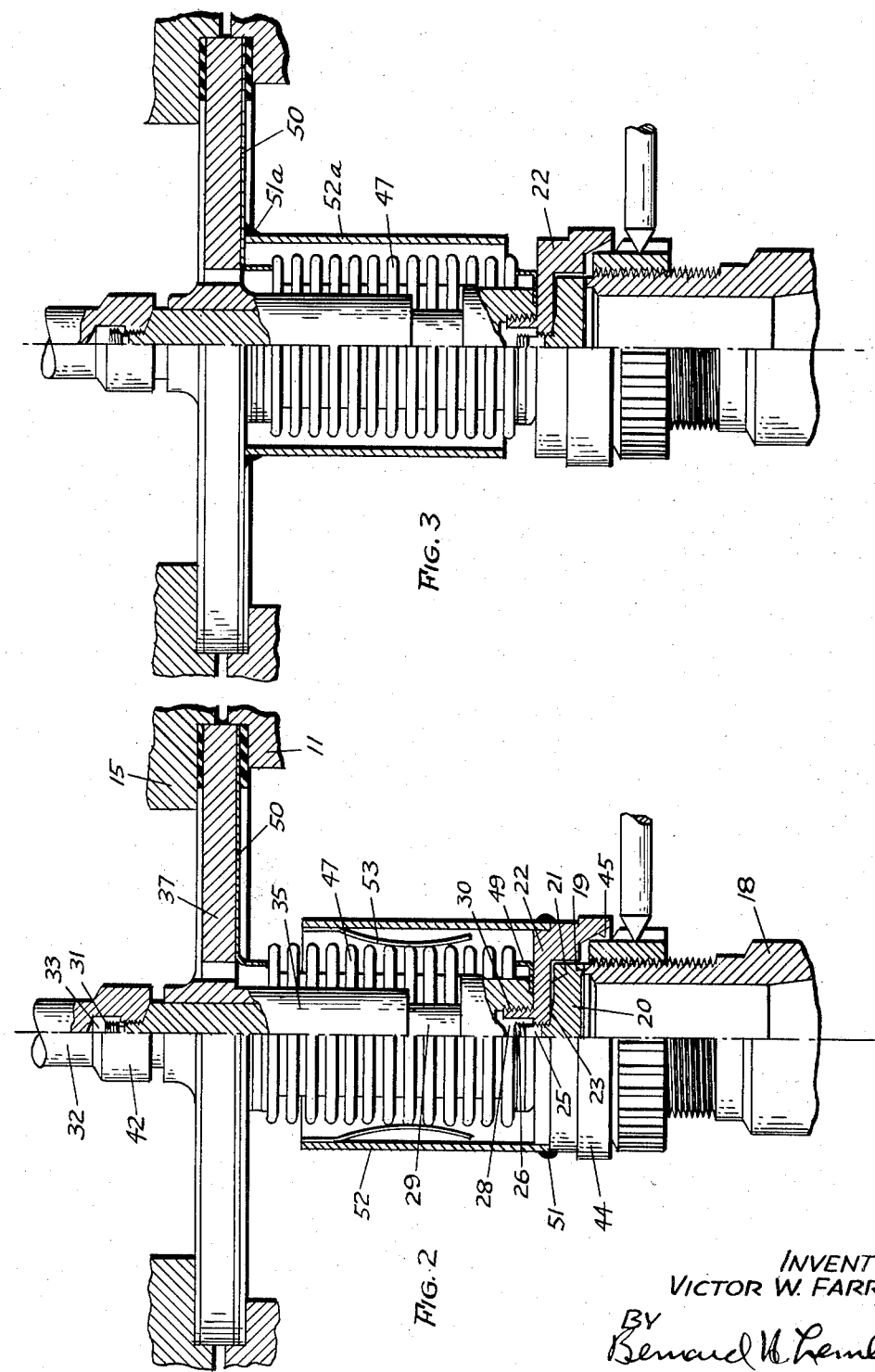

United States Patent Office 2,832,372
Patented Apr. 29, 1958

2,832,372

SAFETY VALVE HAVING SHIELDED SEALING MEMBER

Victor W. Farris, Tenafly, N. J.

Application February 1, 1954, Serial No. 407,274

3 Claims. (Cl. 137—528)

This invention relates to safety valves adapted to control the flow of high-velocity fluids.

In devices of this type, it is difficult to isolate the spring chamber from the body of the valve through which the fluid flows and in certain cases, it is desirable that such an isolation be effected.

In an effort to solven this problem, it has heretofore been proposed to employ a flexible bellows having one end sealed to the valve disc and the other end sealed at the junction of the valve body and spring chamber. Such a mechanism is disclosed in my copending application entitled "Safety Valve," Serial No. 186,961, filed September 27, 1950, now abandoned and the present application constitutes a continuation-in-part of said copending application.

However, while the mechanism disclosed in said copending application has been effective in solving the isolation problem above referred to, another problem has been introduced, and it is to the avoidance of this other problem, that the present invention is addressed.

It has been found that direct exposure of the bellows to the high velocity currents of the discharging fluid subjects the bellows to axial distortion in the direction of the discharge and sometimes sets up harmonic vibrations in the bellows. Both of these tendencies unduly strain the bellows and cause fracturing and breakage.

It has further been found that these strains and vibrations can be elminated by surrounding the bellows with a region of static pressure. In so doing, the bellows is no longer directly exposed to the discharging currents and the breakage above mentioned is avoided.

It is, therefore, the main object of the present invention to effectuate the foregoing improvement in a simple and inexpensive manner.

In the accompanying specification there shall be described, and in the annexed drawings shown, two illustrative embodiments of the safety valves of the present invention. It is, however, to be clearly understood that the present invention is not to be limited to the exact details herein shown and described for purposes of illustration only, inasmuch as changes may be made therein without the exercise of invention and within the true spirit and scope of the claims hereto appended.

In said drawings, Fig. 1 is a longitudinal sectional view taken substantially through the center of a valve incorporating one of the aforesaid illustrative embodiments of the present invention;

Fig. 2 is an enlarged partially vertical sectional, partially elevational view of a portion of said valve; and Fig. 3 is a view similar to Fig. 2 but showing the second of the aforesaid illustrative embodiments of the present invention.

Referring now more in detail to the first of said embodiments, with particular reference to Figs. 1 and 2 of the drawings, the numeral 10 generally designates a safety valve including a valve body 11 having a central chamber 12 and inlet and outlet ports 13 and 14 communicating with said central chamber, a bonnet 15 mounted on said body 11 and providing a spring chamber 16, and a cap 17 secured at the upper end of said bonnet 15.

Threadedly engaged in the inlet port 13, and extending into the central chamber 12 of the body 11, is a high velocity nozzle 18 at the inner end of which is formed a seat 19.

Cooperable with the seat 19 is a valve disc 20, said disc being disposed in a recess 21 formed in the underside of a disc-holding member 22. The upper surface of the disc 20 is provided with a spherical portion 23 adapted slidingly to engage in a corresponding concavity formed in the bottom of the recess 21 of the disc-holding member 22.

Rising from the center of the spherical portion 23 of the disc 20 is a rod-like extension 25 having at the outer end thereof an enlarged threaded head 26, said head being received, through a reduced threaded bore in the disc-holding member 22 in a recess 28, which is larger than said head and said bore, formed in the lower end of a plunger 29. The plunger 29 is threaded, as at 30, to the disc-holding member 22. Thus, a universal joint is provided between the disc 20 and the rigidly interconnected disc-holding member 22 and plunger 29, whereby the disc has sufficient freedom of movement to locate itself and come home true on the seat 19.

The upper end of the plunger 29 is provided with an enlarged threaded head 31, said head being received, through a reduced threaded bore in the lower end of a valve stem 32, in a recess 33, which is larger than said head and said bore, and which is also formed in the lower end of said stem. Thus, a universal joint is provided between the plunger 29 and the valve stem 32, whereby misalignment of the stem will not affect the seating of the valve.

The plunger 29 is slidably mounted in a sleeve 35 secured in a central aperture formed in a baffle 37 firmly gripped between the valve body 11 and the bonnet 15.

The upper end of the stem 32 is slidably mounted in a spring-adjusting screw 38 engaged in the bonnet 15, said screw bearing against a button 39 which is loosely mounted on the stem 32 and which, in turn, bears against the upper end of a coil spring 40. The lower end of the spring 40 bears against another button 41 which, in turn, abuts an enlargement 42 formed on the stem 32. The screw 38 is adapted to be locked in position by a nut 43.

Surrounding the disc 20 and formed on the disc-holding member 22, is a depending flange 44, said flange having an interior surface 45 which flares outwardly in a direction opposite to the flow of the fluid through the nozzle 18.

In order to isolate the central chamber 12 of the valve body 11 from the spring chamber 16 provided by the bonnet 15, the guiding sleeve 35 and the plunger 29 slidable therein are surrounded by a sealing member, preferably, in the form of a flexible bellows 47 consisting of expandable convolutions having a cylindrical skirt portion 49 at one end and a flange portion 50 at the opposite end. The skirt portion 49 is secured between the lower end of the plunger 29 and the disc-holding member 22 and the outer periphery of the flange portion 50 is secured intermediate the valve body 11 and the baffle 37.

Surrounding the bellows 47, in spaced relation thereto, and fixed at its lower end to an appropriate step formed in the disc-holding member 22, as by welding 51, is a cylindrical shield 52 made, preferably, of stainless steel. The shield 52 extends upwardly along the bellows but stops sufficiently short of the bellows flange 50 to allow the valve to open to its fullest extent without hindrance by contact between the upper end of the shield and said bellows flange. If desired, although not necessary, there may be secured to the inner surface of the shield 52, spring clips 53, or the like, bearing lightly against the convolutions of the bellows 47 to dampen any vibrations set up therein.

This completes the description of the first of the aforesaid illustrative embodiments of the present invention.

In the second of said embodiments the valve structure, including the bellows 47, is exactly the same as above described. However, in this embodiment, instead of the shield, now designated by the reference character 52a, being fixed to the disc-holding member 22, it is secured, by welding 51a, at its upper end, to the bellows flange 50, depending from said flange and terminating a sufficient distance from the disc-holding member 22 to avoid contact therewith when the valve is opened to its fullest extent.

Thus, by virtue of the shields 52 or 52a, the bellows 47 is protected from the direct effects of the discharging currents. A region of static pressure is built up within the shields and distortions are thereby avoided.

Other objects and advantages of the present invention will readily occur to those skilled in the art to which the same relates.

What is claimed is:

1. A safety valve comprising: a valve body; a nozzle extending into said valve body, and having at its inner end a valve seat surrounding a discharge orifice; a disk-holding member mounted in said valve body; a valve disk mounted in said disk-holding member and cooperable with said valve seat to control communication through said discharge orifice; a flexible bellows disposed in the path of fluid passing through said valve body and having its ends anchored, respectively, to said valve body and said disk-holding member; and a shield surrounding said bellows in spaced relation thereto to protect the same against distortion by the discharging fluid; said shield having spring clips mounted therein in light contact with the convolutions of said bellows to dampen any vibrations set up therein.

2. A safety valve comprising: a valve body; a nozzle extending into said valve body, and having at its inner end a valve seat surrounding a discharge orifice; a disk-holding member mounted in said valve body; a valve disk mounted in said disk-holding member and cooperable with said valve seat to control communication through said discharge orifice; a flexible sealing member disposed in the path of fluid passing through said valve body and having ends anchored, respectively, to said valve body and said disk-holding member; and a shield surrounding said sealing member in spaced relation thereto to protect the same against distortion by the discharging fluid, said shield having spring clips mounted therein in light contact with said sealing member to dampen any vibrations set up therein.

3. A safety valve comprising: a valve body; a nozzle extending into said valve body, and having at its inner end a valve seat surrounding a discharge orifice; a disk-holding member mounted in said valve body; a valve disk mounted in said disk-holding member and cooperable with said valve seat to control communication through said discharge orifice; a flexible bellows disposed in the path of fluid passing through said valve body and having its ends anchored, respectively, to said valve body and said disk-holding member; and a shield surrounding said bellows in spaced relation thereto to protect the same against distortion by the discharging fluid; said shield carrying flexible means in light contact with the convolutions of said bellows to dampen any vibrations set up therein.

References Cited in the file of this patent

UNITED STATES PATENTS

| | | |
|---|---|---|
| 997,296 | Isenberg | July 11, 1911 |
| 1,289,434 | Fulton | Dec. 31, 1918 |
| 1,392,890 | Fulton | Oct. 4, 1921 |
| 1,846,226 | Smith | Feb. 23, 1932 |
| 2,239,169 | Franck | Apr. 22, 1941 |
| 2,249,101 | Wile | July 15, 1941 |
| 2,264,656 | Briscoe | Dec. 2, 1941 |
| 2,299,079 | Davis | Oct. 20, 1942 |
| 2,517,858 | Farris | Aug. 8, 1950 |
| 2,693,822 | Gerow | Nov. 9, 1954 |
| 2,735,619 | Schutt | Feb. 21, 1956 |